UNITED STATES PATENT OFFICE.

THOMAS SHEEHAN, OF DUNKIRK, NEW YORK.

IMPROVED PROCESS FOR STEELIFYING IRON.

Specification forming part of Letters Patent No. 76,256, dated March 31, 1868.

*To all whom it may concern:*

Be it known that I, THOMAS SHEEHAN, of Dunkirk, in the county of Chautauqua and State of New York, have invented certain new and useful Improvements in the Process for Steelifying Iron; and I do hereby declare that the following is a full, clear, and exact description thereof, reference being had to the accompanying drawings, and to the letters of reference marked thereon, which form a part of this specification.

The nature of my invention consists in a new process of steelifying iron, substantially in the manner hereinafter specified.

The first step in my process is to procure a cast-iron box, in size adapted to the bulk of iron to be operated on. The said box will be provided with a cover, and will have within it a perforated iron plate, for the purpose hereinafter described. The perforations of said plate will be about one-eighth of an inch in diameter, and in distance apart about one inch.

In preparing my ingredients I take two hundred parts charcoal, saturated with water, but not too wet. Then I take thirty pounds of muriate of soda and twelve parts of sal-soda, pulverized, to which I add five parts of common black rosin, well pulverized, and five parts of black oxide of manganese. The ingredients thus specified must be well mixed together in a tub of suitable dimensions. The next step is to take the box above described and put in it a layer of limestone, broken into pieces, not very fine, the layer to be an inch and a half or two inches thick. Over the top of said layer I now place the perforated plate above described. On the top of said plate I next put a layer of about two inches in thickness of the charcoal mixture, as above specified. I now take the iron intended to be steelified and put in on the top of said layer. Another layer of the charcoal mixture is now put on the iron, and alternate layers of iron and charcoal supplied until the box is filled, always finishing, however, with a heavy layer of charcoal mixture.

Care must be taken to prevent the iron designed to be hardened from coming in contact with the iron box at any point, and also to prevent the contact of any two of the successive layers of iron.

The iron being arranged in the box as above described, the next step is to lute the cover of the box with a mixture of yellow clay and sand, with a little salt in it to keep it from cracking. The box will now be put in an open furnace suitable for the purpose, and a fire made of hard coal and wood, and keep the box subject to strong heat from two to seven hours, according to the size of the box and the bulk of iron intended to be steelified. As the heat increases the carbon will be expelled from the limestone in the bottom of the box, and the carbon will unite with the oxygen and carbonaceous ingredients of the charcoal compound, as aforesaid, and will convert the iron in the box into steel on its entire surface. I then take said iron out of the box, when it is of a bright cherry red, and chill it quickly in a large vessel of cold clear water. The surface of the steelified iron will now be smooth and free from scales.

One of the advantages of my process is, that the iron will get a charcoal annealing which will render it infrangible, while other processes are liable to crystallize the iron and render it brittle. After taking the iron out of the box it will be proper to take out also the residuum of the charcoal mixture while hot and lay it on a plate of sheet-iron, and then cool it down with water, taking great care not to let the burnt lime at the bottom of the box mix with said residuum. The longer the residuum is exposed to the air the better it will answer for future hardening.

Having thus described my invention, what I claim as new, and desire to secure by Letters Patent, is—

1. The combination of the ingredients composing the charcoal compound, substantially as and for the purpose set forth.

2. The combination of the charcoal compound with the broken limestone, substantially as and for the purpose described.

3. The employment of a perforated plate, when used as and for the purpose specified.

In testimony that I claim the foregoing as my own I affix my signature in presence of two witnesses.

THOMAS SHEEHAN.

Witnesses:
 WM. BOOKSTANE,
 F. F. DRIGGS.